3,705,890
CELLULOSE CARBONATES AND METHODS FOR THEIR PREPARATION

Sidney Alan Barker, John Frederick Kennedy, and Charles John Gray, Birmingham, England, assignors to Ranks Hovis McDougall Limited, London, England
No Drawing. Filed Dec. 14, 1970, Ser. No. 98,214
Claims priority, application Great Britain, Dec. 18, 1969, 61,701/69
Int. Cl. C08b 3/04
U.S. Cl. 260—228                 9 Claims

ABSTRACT OF THE DISCLOSURE

Cellulose carbonate is prepared by reacting cellulose or a 6-substituted cellulose, e.g. methyl cellulose, hydroxyethyl cellulose, carbomethyl cellulose and diethylaminoethyl with an alkyl or aryl chloroformate.

---

This invention is for improvements in or relating to cellulose derivatives and has particular reference to cellulose carbonate.

It is an object of the invention to provide as new chemical compounds cellulose carbonates and methods for their preparation.

A cellulose carbonate prepared as hereinafter described in Examples I to III may be employed inter alia as a solid matrix in chemical coupling with enzymes such as glucosidase and trypsin or mixtures of one or more enzymes as described in our copending application No. 95,414, filed Dec. 4, 1970 in order to provide water insolubilized enzyme preparations in a form in which they can be used repeatedly and be more stable to heat than the corresponding soluble enzyme.

The reaction of excess of ethyl chloroformate with pyranoid compounds containing vicinial diequatorial hydroxy groups is known to give trans-five membered cyclic derivatives in the presence of triethylamine. Thus methyl 4,6 - O - benzylidiene-α-D-glucopyranoside gave the 2,3-carbonate and methyl 2,6-di-O-methanesulphonyl-α-D-glucopyranoside gave the 3,4-cyclic ester (Doane, W. M., Shasha, B. S., Stout, E. I., Russell, C. R. and Rist, C. E. Carbohydrate Res., 4, 445 [1967]). According to reaction conditions methyl 4,6 - O - benzylidene-α-D-glucopyranoside also gave the 2,3-di-O-ethyloxycarbonyl or the 2- and 3-monoesters. These workers also stated that the 2,3-transfused cyclic carbonates showed characteristic absorptions in the region of 1825 cm.$^{-1}$ and 1840 and 1810 cm.$^{-1}$ of the infra-red spectrum. The O-ethyloxycarbonyl group absorbed at 1750 cm.$^{-1}$. Carbonate derivatives have been made of polysaccharides such as dextran and dextrin, that are soluble in dimethyl sulphoxide (Doane W. M., Stout, E. T., Shasha, B. S., Russell, C. R. and Rist, C. E. Carbohyd. Res. 5, 366 [1967], 8, 266 [1968]). The cellulose carbonate described herein is so far as we are aware the first insoluble polymer converted to its carbonate derivative. 2,3-trans cyclic carbonates undergo ring opening with methanol, toluenethiol or piperidine to give mixtures of the 2- or 3-substituted derivatives in the presence of triethylamine (South, E. I., Doane, W. M., Shasha, B.S., Russell, C. R. and Rist, C. E. Tetrahedron letters 4481 [1967]).

The invention accordingly provides a cellulose carbonate more particularly a cellulose 2,3-carbonate. The invention further provides derivatives of cellulose including trans cyclic carbonate groupings bridging $C_2$ and $C_3$ of some or all of its 1,4-β-D-glucopyranose units. The cellulose may also be substituted at $C_6$ in some or all of its 1,4-β-D-glucopyranose units. Thus the cellulose carbonate may contain not only cyclic carbonate structures derived by reaction of ethyl chloroformate with the trans hydroxyl groups on carbon two and carbon three of some or all of the D-glucopyranose residues in the cellulose but also O-ethyloxycarbonyl groups derived by the reaction of ethyl chloroformate with certain of the hydroxyl groups on carbon two, three or six of the D-glucopyranose residues.

According to the present invention there is also provided a process for the preparation of a cellulose carbonate which comprises reacting cellulose or a 6-substituted cellulose with an alkyl or aryl chloroformate in an organic solvent.

The chloroformate is preferably ethyl chloroformate. Methyl chloroformate, phenyl chloroformate and benzyl chloroformate may also be employed.

The reaction may be conveniently carried out at 0° C. for approximately 10 minutes in dimethyl sulphoxide/dioxan. Dimethylformamide/dioxan or other solvent mixture may also be employed.

A base for example a tertiary amine is preferably present.

All components of the reaction are preferably dry.

The ethyl chloroformate and tertiary amine, e.g. triethylamine, may be dissolved in dimethyl sulphoxide or dimethylformamide or other solvent or solvent mixture devoid of —OH, —SH, —NH and —NH$_2$ groups.

The 6-substituted cellulose may be methyl cellulose, hydroxyethyl cellulose, carboxymethyl cellulose or diethylaminoethyl cellulose. Thus the cellulose employed as starting material may be already substituted at $C_6$ in some or all of its 1,4-β-D-glucopyranose residues.

The cellulose carbonate products of the present invention may also be employed as intermediates in the preparation of 6-substituted cellulose derivatives with modified solubility properties which derivatives may be more resistant to microbial breakdown.

Following is a description by way of example of methods of carrying the invention into effect.

EXAMPLE I

Cellulose (1 g. Sigmacell type 38 purchased from Sigma Chemical Co., England) was suspended in liquid dimethyl sulphoxide (10 ml.), p-dioxan, (1.5 ml.) and triethylamine (8 ml.) and stirred at 0° C. for 5 minutes. Ethyl chloroformate (16 ml.) was added dropwise, and stirring continued for 10 minutes. The mixture is then neutralized to pH 7.0 with 6 N HCl. The mixture was suspended in 90% ethanol (400 ml.) at 20° C. using a Waring Blendor, filtered, and the cellulose carbonate washed with 90% ethanol (200 ml.), ethanol (200 ml.) diethyl ether (200 ml.) and dried in vacuo over P$_2$O$_5$ at 20° C.

EXAMPLE II

Example I was scaled up five times except that proportionally more dimethyl sulphoxide (150 ml.) was used to suspend the cellulose and only 400 ml. diethyl ether for washing the cellulose carbonate.

This sample and a cellulose control were analysed by quantitative infrared spectral analysis. Samples (1–3 mg.) were accurately weighed and mixed with ground dry potassium bromide (300 mg.). After grinding, the homogeneous mixture was pressed at 9.5 tons in a die in an evacuated chamber, and the resultant potassium bromide disc (13 mm. diameter, 0.8375 mm. thick) placed in the sample beam of a Perkin-Elmer Model 21 double beam infrared spectrophotometer with a scanning range of 4000–650 cm.$^{-1}$. A blank potassium bromide disc was placed in the reference beam, and scanning was carried out in the range 2000–1600 cm.$^{-1}$. The sample showed peaks at 1835, 1810 and 1750 cm.$^{-1}$, and, in terms of a calibration curve constructed from a sample of dextran carbonate containing a known proportion of cyclic carbonate groups assessed by an independent method, the sample contained cyclic carbonate groups on 12.4% of the sugar units (Table I). Subsequent preparations were analysed by infrared spectroscopy in the same way. Absorption at 1810 cm.$^{-1}$ has been attributed to cyclic carbonate formation while absorption at 1750 cm.$^{-1}$ has been assigned to ethyloxycarbonyl groups.

EXAMPLE III

Example II was scaled up four times (20 g., cellulose) using only 90% ethanol (1.5 l.), ethanol (2 l.) and diethyl ether (0.5 l.) for washing the cellulose carbonate.

EXAMPLE IV

Three lots of cellulose (1 g.) were each suspended in liquid dimethyl sulphoxide (30 ml.), p-dioxan (2 ml.) and triethylamine (8 ml.) and the mixtures stirred at 0° C. for 5 minutes. Methyl chloroformate (13 ml.), ethyl chloroformate (16 ml.) or phenyl chloroformate (21 ml.) was added dropwise to each, and the mixtures left for 10 minutes and then neutralised to pH 7.0 with 6 N hydrochloric acid. The three products were recovered as described in Example I, and examined for infrared absorption at 1835, 1810 and 1750 cm.$^{-1}$.

| Product from— | Infra-red absorption at— | | |
|---|---|---|---|
| | 1,835 | 1,810 | 1,750 cm$^{-1}$ |
| Methyl chloroformate, 0.95 g. | Absent | Absent | Present. |
| Ethyl chloroformate, 0.80 g. | Present | Present | Do. |
| Phenyl chloroformate, 0.96 g. | do | do | Do. |

Repetition of the above procedures omitting dimethyl sulphoxide entirely and using p-dioxan (30 ml.) gave products whose infrared spectra showed little or no absorption at 1835, 1810 or 1750 cm.$^{-1}$, whether derived from methyl, ethyl or phenyl chloroformate. A similar experiment with benzyl chloroformate (24 ml.) gave a similar result.

EXAMPLE V

Cellulose (0.2 g., type as used in Example I), dried in vacuo over phosphorus pentoxide at 20° C. for 24 hours, was suspended in dimethyl sulphoxide which had been dried with calcium hydride and distilled under reduced pressure, B.P. 37° C. at 0.5 mm. Hg (2.0 ml.). p-Dioxan, dried by refluxing for 12 hours with molten sodium and distilled (0.3 ml.), and triethylamine, dried by treating with potassium hydroxide pellets for 24 hours and distilled, (1.6 ml.) were added and the mixture stirred at 0° C. in an ice bath for 5 minutes. Ethyl chloroformate (3.2 ml.) was added dropwise over 12 minutes, and the mixture left to react with stirring for 10 minutes. The mixture was then neutralised to pH 7.0 by the addition of 6.0 N hydrochloric acid. The mixture was washed by stirring and centrifuging with ethanol (9×15 ml.), diethyl ether (3×15 ml.) at 20° C., and then dried in vacuo over phosphorus pentoxide at 20° C.

EXAMPLE VI

Cellulose (4×0.2 g.) was suspended in dry dimethyl sulphoxide, dry p-dioxan and dry triethylamine, and was treated with ethyl chloroformate exactly as described in Example V but using reaction times of 10, 30, 60 and 240 minutes. After these times, the reaction mixtures were immediately washed by stirring and centrifuging with p-dioxan, which had been dried as in Example V (10×15 ml.). The first stirring and centrifuging times were standardised to effect termination of the reaction within 1 minute. After these washings, the supernatent p-dioxan diluted 1:1 with water showed a pH of 7.5. Washing was continued with ethanol which had been dried over calcium oxide for 24 hours and distilled (3×15 ml.), and then continued with diethyl ether, which had been dried over sodium wire (3×15 ml.), at 20° C. and the products dried and stored as in Example V.

EXAMPLE VII

Cellulose (5× 0.2 g.) was reacted with ethyl chloroformate exactly as described in Example VI, using only the 10 minute reaction time but varying the amount of dimethyl sulphoxide (2.0, 1.5, 1.0, 0.5 and 0.0 ml.). In each case where less than the standard amount (2.0 ml.) of dimethyl sulphoxide was used, extra p-dioxan (0.5, 1.0, 1.5 and 2.0 ml. respectively) was used to maintain the concentration of the other reagents. After the reaction, washing and storage were effected as described in Example VI.

EXAMPLE VIII

Cellulose (4× 0.2 g.) was reacted with ethyl chloroformate as described in Example VI, using only the 10 minute reaction time but varying the amount of triethylamine (1.6, 0.8, 0.4 and 0.0 ml.). In each case where less than the standard amount (1.6 ml.) of triethylamine was used, extra p-dioxan (0.8, 1.2 and 1.6 ml. respectively) was used to maintain the concentration of the other reagents. After the reaction, washing and storage were effected as described in Example VI.

EXAMPLE IX

Cellulose (0.2 g.) was suspended as described in Example VI, but using, in place of dimethyl sulphoxide, dimethylformamide which had been dried over potassium hydroxide then calcium oxide and distilled (2.0 ml.). The reaction with ethyl chloroformate was allowed to proceed for 10 minutes. Washing and storage were effected as described in Example VI.

EXAMPLE X

Cellulose (0.2 g.) was treated exactly as described in Example IX. A second lot (0.2 g.) was similarly treated but using less dimethylformamide (1.0 ml.) and additional p-dioxan (1.3 ml. total).

EXAMPLE XI

Cellulose (0.2 g.) was treated exactly as described in Example IX. A second lot (0.2 g.) was similarly treated but omitting the use of p-dioxan and using additional dimethylformamide (4.0 ml. total).

EXAMPLE XII

Cellulose (0.2 g.) was treated exactly as described in Example IX. A second lot (0.2 g.) was similarly treated, but omitting the use of triethylamine and replacing it with additional dry p-dioxan (1.9 ml. total).

EXAMPLE XIII

Cellulose (0.2 g.) was treated as described in the second experiment in Example XI. A second lot of cellulose (0.2 g.) was similarly treated, but the ethyl chloroformate was added dropwise over 3 minutes instead of over 12 minutes. A reaction time of 10 minutes was used.

EXAMPLE XIV

Dry solvents, dry washing, other chloroformates in place of ethyl chloroformate. Cellulose (3× 0.2 g.) was treated as described in Example VI but using equivalent molar quantities of methyl, phenyl and benzyl chloroformates (3.2 ml., 4.5 ml. and 5.0 ml. respectively) in place of ethyl chloroformate. Washing and storage were effected as in Example VI.

EXAMPLE XV

Diethylaminoethyl cellulose (Type DE 32, Whatman, 0.2 g.) was reacted with ethyl chloroformate as described in Example VI using the 10 minute reaction time. After the reaction, washing and storage were effected as described in Example VI.

TABLE I.—QUANTITATIVE INFRARED SPECTROSCOPY OF CELLULOSE CARBONATES

| Example | Description of preparation [1] | Optical density per mg. at the maxima of the peaks occuring at the following frequencies— | | | | Relative height of cyclic carbonate [2] | Absorbancy [3] |
|---|---|---|---|---|---|---|---|
| | | 1,835 cm.$^{-1}$ | 1,810 cm.$^{-1}$ | 1,750 cm.$^{-1}$ | 1,675 cm.$^{-1}$ | | |
| II | Wet solvents, larger scale, neutralized before wet washing | 0.0501 | 0.0944 | 0.0679 | 0.0000 | 1.00 | 0.72 |
| V | Dry solvents, neutralised before wet washing | 0.1551 | 0.1833 | 0.1766 | 0.0000 | 1.95 | 0.96 |
| VI | Dry solvents, dry washing— | | | | | | |
| | 10 minutes reaction time | 0.3409 | 0.4122 | 0.1476 | 0.0685 | 4.37 | 0.36 |
| | 30 minutes reaction time | 0.1525 | 0.2139 | 0.1698 | 0.0000 | 2.26 | 1.79 |
| | 60 minutes reaction time | 0.0912 | 0.1192 | 0.1188 | 0.0000 | 1.35 | 0.93 |
| | 240 minutes reaction time | 0.0848 | 0.1150 | 0.1015 | 0.0000 | 1.21 | 0.89 |
| VII | Dry solvents, dry washing— | | | | | | |
| | 0.75 standard amount DMSO [4] | 0.2041 | 0.2009 | 0.2255 | 0.0130 | 2.13 | 1.12 |
| | 0.50 standard amount DMSO [4] | 0.1380 | 0.1686 | 0.1065 | 0.0181 | 1.78 | 0.63 |
| | 0.25 standard amount DMSO [4] | 0.0600 | 0.0646 | 0.0286 | 0.0177 | 0.68 | 0.44 |
| | 0.00 standard amount DMSO [4] | 0.0322 | 0.0404 | 0.0107 | 0.0158 | 0.43 | 0.26 |
| VIII | Dry solvents, dry washing— | | | | | | |
| | 1.00 standard amount TEA | 0.3630 | 0.3969 | 0.2055 | 0.0636 | 4.20 | 0.52 |
| | 0.50 standard amount TEA | 0.0660 | 0.1288 | 0.0999 | 0.0132 | 1.39 | 0.78 |
| | 0.25 standard amount TEA | 0.0014 | 0.0039 | 0.0015 | 0.0106 | 0.04 | 0.38 |
| | 0.00 standard amount TEA | 0.0000 | 0.0018 | 0.0026 | 0.0108 | 0.02 | 1.48 |
| IX | Dry solvents, dry washing DMF (2 ml.) in place of DMSO | 0.1296 | 0.1509 | 0.0300 | 0.0313 | 1.60 | 0.20 |
| X | Dry solvents, dry washing— | | | | | | |
| | DMF (2 ml.) in place of DMSO | 0.1106 | 0.1400 | 0.0316 | 0.0439 | 1.48 | 0.23 |
| | DMF (1 ml.) plus PD (1 ml.) in place of DMSO | 0.0868 | 0.1057 | 0.0349 | 0.0288 | 1.12 | 0.33 |
| XI | Dry solvents, dry washing— | | | | | | |
| | DMF (2 ml.) in place of DMSO | 0.1525 | 0.1577 | 0.0444 | 0.0447 | 1.67 | 0.28 |
| | DMF (4 ml.) in place of DMSO and PD | 0.1371 | 0.1788 | 0.0394 | 0.0476 | 1.89 | 0.22 |
| XII | Dry solvents, dry washing— | | | | | | |
| | DMF (2 ml.) in place of DMSO | 0.1525 | 0.1577 | 0.0444 | 0.0447 | 1.67 | 0.28 |
| | DMF (2ml.) in place of DMSO, PD (1.6 ml.) in place of TEA | 0.0027 | 0.0115 | 0.0000 | 0.0240 | 0.12 | 0.00 |
| XIII | Dry solvents, dry washing— | | | | | | |
| | DMF (4 ml.) in place of DMSO and PD | 0.1371 | 0.1788 | 0.0394 | 0.0476 | 1.89 | 0.22 |
| | ECF added over 12 minutes DMF (4 ml.) in place of DMSO and PD. ECF added over 3 minutes. | 0.1013 | 0.1332 | 0.0313 | 0.0232 | 1.41 | 0.24 |
| XIV | Dry solvents, dry washing— | | | | | | |
| | BCF (5.0 ml.) in place of ECF | 0.0121 | 0.0276 | 0.0082 | 0.0000 | 0.29 | 0.30 |
| | MCF (3.2 ml.) in place of ECF | 0.0530 | 0.0852 | 0.0537 | 0.0049 | 0.90 | 0.63 |
| | PCF (4.5 ml.) in place of ECF | 0.0092 | 0.0157 | 0.0318 | 0.0000 | 0.17 | 2.03 |
| | Cellulose control | 0.0000 | 0.0000 | 0.0000 | 0.0000 | | |
| XV | Diethylaminoethyl cellulose. Dry solvents, dry washing, 10 minutes reaction time. | 0.0440 | 0.0573 | 0.0000 | 0.0268 | 0.61 | 0.00 |

[1] Standard conditions (0.2 g. dry cellulose, 2.0 ml. dry dimethyl sulphoxide, 0.3 ml. dry p-dioxan, 1.6 ml. dry triethylamine, 3.2 ml. ethyl chloroformate added over 12 minutes, reaction time 10 minutes, washed with 10×15 ml. dry p-dioxan and then 3×15 ml. dry ethanol) are assumed unless specified otherwise. ethanol) dry ml.
[2] (1,810 cm.$^{-1}$ peak) with respect to that in Example II (1,810 cm.$^{-1}$ peak).
[3] At 1,750 cm.$^{-1}$ (due to ethyloxy carbonyl) relative to absorbancy at 1,810 cm.$^{-1}$ (cyclic carbonate)
[4] Abbreviations: BCF=Benzyl chloroformate; DMF=Dimethyl formamide; DMSO=Dimethyl sulphoxide; ECF=Ethyl chloroformate; MCF=Methyl chloroformate; PCF=Phenyl chloroformate; PD=p-Dioxan; TEA=Triethylamine.

Reaction of cellulose carbonate with ammonia and benzylamine

Cellulose carbonate (prepared as in Example VI), 10 minutes reaction time (0.2 g.) was mixed and stirred with 0.36 N ammonium hydroxide (5 ml.) at 20° C. for 3 hours. After centrifugation, aliquots of the supernatant were titrated with 0.1 N hydrochloric acid. The centrifuged product was washed and dried as in Example VI and I.R. analysis carried out as usual. Elemental analysis of the coupled product yielded C=41.6%, H=5.7% and N=0.8%. The nitrogen content corresponds to a minimum cyclic carbonate content of 11.7% compared with 16.7% based on titration. The total cyclic carbonate available for reaction, based on I.R. analysis together with the appropriate calibration curve with dextran carbonate was 37.6%. A similar coupling was carried out with benzylamine, and the percentage cyclic carbonate based on titration was 11.4% compared with 14.7% based on nitrogen content.

The ring opening reactions of ammonia and benzylamine to give urethane links further demonstrate the initial presence of the trans 2,3 cyclic carbonate.

We claim:

1. A process for the preparation of cellulose carbonate comprising trans-cyclic carbonate groupings, comprising reacting cellulose or a 6-substituted cellulose selected from the group consisting of methyl cellulose, hydroxyethyl cellulose, carboxymethyl cellulose and diethylaminoethyl cellulose with a chloroformate selected from the group consisting of ethyl chloroformate, methyl chloroformate, phenyl chloroformate and benzyl chloroformate in an organic solvent comprising at least one compound selected from the group consisting of dimethylsulfoxide and dimethylformamide.

2. A process as claimed in claim 1 wherein the reaction is carried out at 0° C. for approximately 10 minutes in dimethyl sulphoxide/dioxan.

3. A process as claimed in claim 1 wherein the reaction is carried out in the presence of a tertiary amine.

4. A process according to claim 1, wherein the solvent is substantially anhydrous.

5. A process according to claim 1, wherein the solvent is dimethylformamide/dioxan.

6. A cellulose carbonate comprising trans-cyclic carbonate groupings bridging $C_2$ and $C_3$ of some or all of its 1,4-$\beta$-D-glucopyranose units.

7. A cellulose carbonate according to claim 6, wherein the cellulose is also substituted at $C_6$ in some or all of its 1,4-$\beta$-D-glucopyranose units by methyl, hydroxyethyl, carboxymethyl or diethylaminoethyl groups.

8. A cellulose carbonate comprising cyclic carbonate structures derived by reaction of an alkyl or aryl chloroformate with the trans hydroxyl groups on carbon two and carbon three of some or all of the D-glucopyranose residues in the cellulose and also O-alkoxy or O-aryloxy-carbonyl groups derived by reaction of an alkyl or aryl chloroformate with certain of the hydroxyl groups on carbon two, three or six of the D-glucopyranose residues.

9. A cellulose carbonate according to claim 8, comprising cyclic carbonate structures derived by reaction of ethyl chloroformate with the trans hydroxyl groups on carbon two and carbon three of some or all of the D-glucopyranose residues in the cellulose and also O-ethyloxycarbonyl groups derived by the reaction of ethyl chloroformate with certain of the hydroxyl groups on carbon two, three or six of the D-glucopyranose residues.

References Cited
UNITED STATES PATENTS

| 3,419,543 | 12/1968 | Mold et al. | 260—214 |
| 2,076,555 | 4/1937 | Fothergill | 260—228 |

DONALD E. CZAJA, Primary Examiner

R. W. GRIFFIN, Assistant Examiner

U.S. Cl. X.R.

195—63, 68, Dig. 11; 260—214